UNITED STATES PATENT OFFICE.

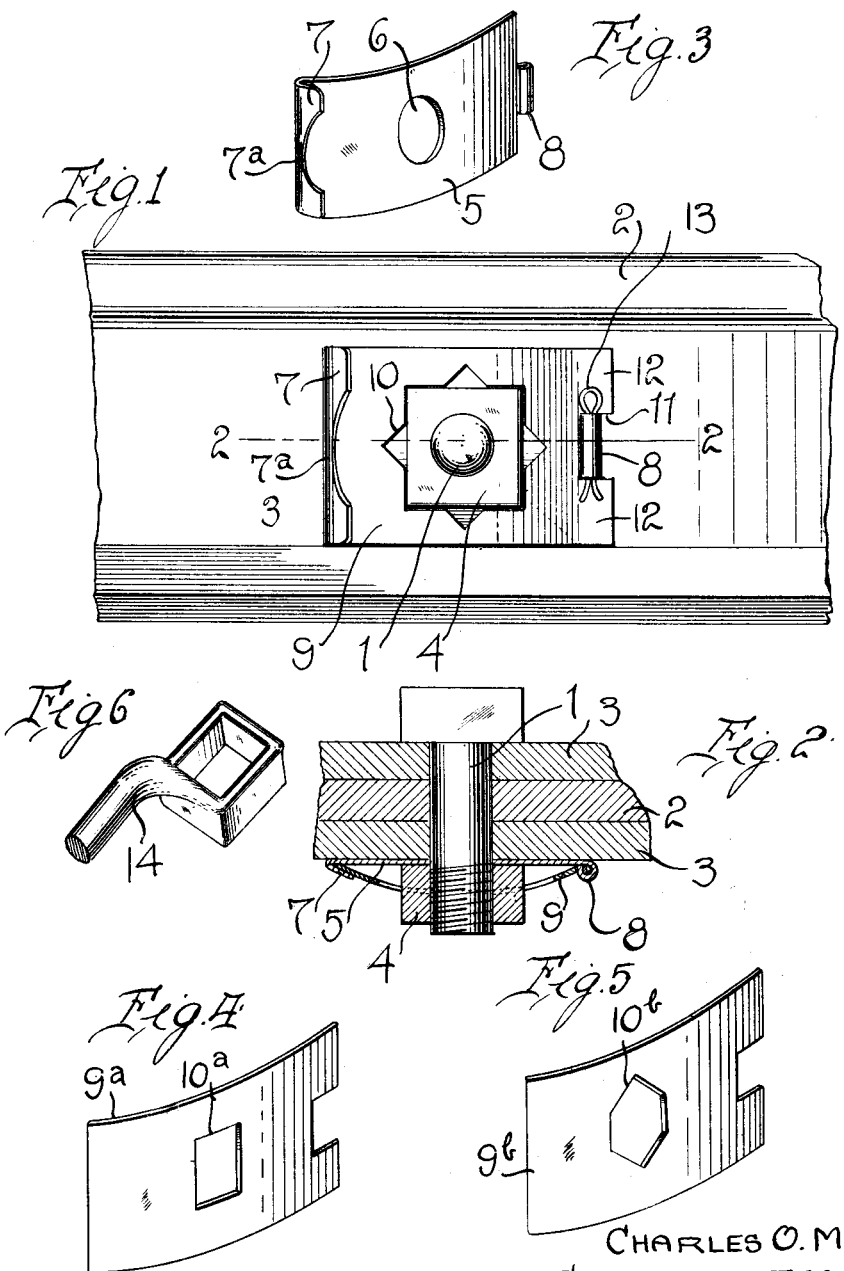

CHARLES O. MYERS AND HOWARD T. MARING, OF GETTYSBURG, PENNSYLVANIA.

NUT-LOCK.

1,142,607.  Specification of Letters Patent.  Patented June 8, 1915.

Application filed January 18, 1915. Serial No. 2,880.

*To all whom it may concern:*

Be it known that we, CHARLES O. MYERS and HOWARD T. MARING, citizens of the United States, residing at Gettysburg, in the county of Adams and State of Pennsylvania, have invented certain new and useful Improvements in Nut-Locks, of which the following is a specification.

This invention comprehends certain new and useful improvements in nut locks, and has for its primary object a simple, durable and efficient construction of device of this character which may be used effectively not only in connection with splice bars, fish plates, angle bars, or rail joints generally, but for structural bridge work, machinery, and, in fact, in any place where it is desirable to prevent the nut from working loose on account of the jars or the like to which it is subjected in service.

A further object of the invention is an improved device of this kind, the parts of which are so constructed and arranged that the device may be applied to any bolt and nut and without mutilating the threads of either of them, the device being further so constructed and arranged that the nut may be released whenever it is desired to remove the same and the bolt which it holds. And the invention also aims to generally improve devices of this kind so as to render them more useful and commercially desirable.

With these and other objects in view, as will more fully appear as the description proceeds, the invention consists in certain constructions, arrangements and combinations of the parts that we shall hereinafter more fully describe and claim.

For a full understanding of the invention, reference is to be had to the following description and accompanying drawing, in which, Figure 1 is a side elevation of a portion of a rail with angle bars secured thereto and with our improved nut locking device in applied position. Fig. 2 is a section taken on the line 2—2 of Fig. 1. Fig. 3 is a detail perspective view on a slightly reduced scale, of one of the plates or members of our device. Figs. 4 and 5 are perspective detail views of two different forms of the nut holding member or plate. Fig. 6 is a detail perspective view of the preferred form of wrench employed in tightening the nut against the base plate of the lock.

Corresponding and like parts are referred to in the following description and designated in all of the views of the accompanying drawing by like reference characters.

Referring to the drawing, the numeral 1 designates a bolt of any desired or conventional design or type, the same being shown in the present instance as extending through a rail 2 and the fish plates 3 which are applied to opposite faces of the rail.

4 designates the nut which, in the present instance, is shown as a four-sided nut, although it will be understood, as hereinafter more specifically pointed out, our device is designed for use with nuts of any number of sides.

Our improved nut locking device includes a base plate 5 which is preferably formed of spring steel or any other desired substance or material of the requisite strength and tenacity, said base plate being preferably bowed in its initial condition, as clearly illustrated in Fig. 3, although it is to be understood that the invention is not limited in this regard. The base plate 5 is formed with an opening 6 designed to receive the bolt 1, and is further formed at one end with an outwardly turned flange 7, while its other end is formed with a transversely elongated apertured ear 8.

9 designates the nut holding member or plate of the device. This plate, in that embodiment of the invention illustrated in Figs. 1 and 2, is formed with polygonal opening 10 designed to accommodate the nut 4 when said nut is disposed with its edges in vertical and horizontal planes or in planes inclined at right angles, at 45° to the vertical and horizontal. The plate 9 is also preferably bowed, as best illustrated in Fig. 2, or so formed in some other manner that the middle portion thereof is in applied position, spaced from the base plate 5 after the latter has been pressed flat against the fish plate or other work by the screwing up of the nut 4, whereby the wall of the opening 10 will engage the nut 4 at any desired point between the inner and outer faces thereof, also as illustrated in Fig. 2. One end of the plate 9 is designed to be inserted underneath or behind the flange 7, while the other end is formed with a recess 11 which defines two spaced-apart lugs 12 that are designed to extend across the opposite ends of the ear 8 which is received in the recess 11 when the parts are in their assembled position.

13 designates a locking key or cotter pin of any desired construction or design, adapted to be inserted into and through the ear 8, so as to engage the lugs 12 and securely hold the plate 9 in place.

From as much of the description as has preceded, in connection with the correlated views of the accompanying drawing, it will be understood that in the practical application or use of our improved nut lock, after the bolt has been inserted into the work, the base plate 5 will be applied in a convenient manner and as the nut 4 is screwed up, it will press the base plate 5 out flat, so that said plate will be held under tension and its tendency to resume its normal bowed shape will tend to take up wear and assist in holding the nut secure. After the nut has been screwed up, the plate 9 is applied by having one end inserted underneath or behind the flange 7, and the nut 4 is received in the opening 10, the lugs 12 being disposed on opposite sides of the ear 8, after which the cotter pin 13 or some similar fastening device is inserted in place and the parts will be securely held, while at the same time, whenever it is desired to loosen or remove the nut, the cotter pin or other fastening 13 may be easily withdrawn and the plate 9 moved outwardly so as to release the nut therefrom.

Preferably, the flange 7 is formed with a curved recess 7ª as clearly illustrated in Figs. 1 and 3, whereby an ordinary straight-handled wrench may be applied to the nut and turned, the recess 7ª serving as a clearance for the handle or other portion of the wrench; but we prefer to use a wrench of the character illustrated in Fig. 6, provided with an offset handle, designated 14, which will clear all of the parts of our device while the wrench is being manipulated.

As set forth near the outset of the specification, the nut holding plate or members 9 are designed for nuts of any number of sides. Thus it will be seen that in Fig. 4 the nut holding plate, here designated 9ª is formed with a squared opening 10ª for a four-sided nut, and by referring to Fig. 5, it will be seen that the plate, there designated 9ᵇ, is formed with a six-sided opening 10ᵇ, for a hexagonal nut.

It will thus be seen that we have provided a very simple, durable and efficient construction of nut lock in which the parts are so arranged that they may be applied to a bolt and nut of any desired construction, type or form, without injuring the threads of either the bolt or nut, and whereby the nut will be securely held from turning so long as the device is applied thereto, while at the same time whenever it is desired to loosen or remove the nut that operation may be readily accomplished, as the parts of our locking device may be very readily disassembled.

While the accompanying drawing illustrates what we believe to be the preferred embodiment of our invention, it is to be understood that the invention is not limited thereto but that various changes may be made in the construction, arrangement and proportions of the parts without departing from the scope of the invention as defined in the appended claim.

What we claim, is:

The combination with a nut and bolt, of a nut lock including a base plate formed with an opening to receive the bolt, an upstanding flange formed at one terminal of the plate, a rolled ear formed at the other terminal of the plate, a bowed holding plate having a polygonal opening adapted to receive a nut, one terminal of the bowed plate being provided with an opening, said opening defining a pair of transversely spaced lugs which extend longitudinally from the plate, the lugs being adapted to embrace and bear against opposite terminals of the rolled ear when the bowed plate is applied to the base plate, that end of the bowed plate remote from the lugs being adapted to be inserted behind and embraced by said flange, and a fastening device inserted in the rolled ear and projecting exteriorly thereof at each terminal for engagement with the lugs, whereby the lugs are held against lateral movement from the base plate, said ear serving to hold the bowed plate against transverse movement in either direction on the base plate.

In testimony whereof we affix our signatures in presence of two witnesses.

CHARLES O. MYERS.
HOWARD T. MARING.

Witnesses:
J. DONALD SWOPE,
H. G. WILLIAMS.